US012802488B2

(12) United States Patent
Hashimoto

(10) Patent No.: US 12,802,488 B2
(45) Date of Patent: Nov. 17, 2026

(54) INFORMATION PROCESSING APPARATUS, INFORMATION PROCESSING METHOD, AND RECORDING MEDIUM

(71) Applicant: NEC Corporation, Tokyo (JP)

(72) Inventor: Hiroshi Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 213 days.

(21) Appl. No.: 18/718,834

(22) PCT Filed: Dec. 15, 2021

(86) PCT No.: PCT/JP2021/046251

§ 371 (c)(1),
(2) Date: Jun. 12, 2024

(87) PCT Pub. No.: WO2023/112198

PCT Pub. Date: Jun. 22, 2023

(65) Prior Publication Data

US 2025/0054336 A1 Feb. 13, 2025

(51) Int. Cl.
*G06V 40/16* (2022.01)
*G06V 10/74* (2022.01)
(Continued)

(52) U.S. Cl.
CPC .......... *G06V 40/172* (2022.01); *G06V 10/761* (2022.01); *G06V 10/774* (2022.01); (Continued)

(58) Field of Classification Search
None
See application file for complete search history.

(56) References Cited

U.S. PATENT DOCUMENTS 6,535,616 B1 * 3/2003 Hayashi ............... H04N 19/186
382/233
7,328,847 B1 * 2/2008 Shen ........................ G06K 7/14
235/468
(Continued)

FOREIGN PATENT DOCUMENTS

JP 2004-078686 A 3/2004
JP 2008-071366 A 3/2008
(Continued)

OTHER PUBLICATIONS

JP Office Action for JP Application No. 2023-567383, mailed on Apr. 22, 2025 with English Translation.
(Continued)

*Primary Examiner* — Sath V Perungavoor
(74) *Attorney, Agent, or Firm* — Sughrue Mion, PLLC

(57) ABSTRACT

Provided are: an acquisition unit that acquires a determination target image capturing a plurality of faces; a determination unit that determines whether two faces of the plurality of faces captured in the determination target image, are similar to a predetermined extent or more; and a storage unit that stores two face images respectively including the two faces, in association with a different person label indicating that two people corresponding to the two face images are non-identical persons, in a case where the two faces are similar to a predetermined extent or more.

7 Claims, 7 Drawing Sheets

(51) Int. Cl.
*G06V 10/774* (2022.01)
*G06V 40/50* (2022.01)

(52) U.S. Cl.
CPC .......... *G06V 40/166* (2022.01); *G06V 40/168* (2022.01); *G06V 40/50* (2022.01)

(56) References Cited

U.S. PATENT DOCUMENTS

| | | | | |
|---|---|---|---|---|
| 7,376,276 | B2 * | 5/2008 | Shniberg | G06F 16/532 707/E17.03 |
| 8,027,523 | B2 * | 9/2011 | Sun | G06V 40/171 348/267 |
| 2003/0210808 | A1 * | 11/2003 | Chen | G06V 40/16 382/118 |
| 2006/0061598 | A1 * | 3/2006 | Mino | G06T 11/60 345/629 |
| 2006/0110044 | A1 * | 5/2006 | Reissman | G06V 10/426 382/203 |
| 2010/0226584 | A1 * | 9/2010 | Weng | G06V 10/70 382/225 |
| 2010/0266166 | A1 * | 10/2010 | Kawahara | G06V 40/173 382/118 |
| 2011/0043437 | A1 * | 2/2011 | Tang | G06F 16/583 345/55 |
| 2011/0069074 | A1 * | 3/2011 | Kuma | G06F 16/54 345/522 |
| 2011/0150340 | A1 * | 6/2011 | Gotoh | G06V 40/175 382/190 |
| 2013/0121584 | A1 * | 5/2013 | Bourdev | G06V 40/171 382/218 |
| 2014/0040187 | A1 * | 2/2014 | Hatori | G06V 40/172 707/609 |
| 2015/0269422 | A1 | 9/2015 | Wada | |
| 2021/0082107 | A1 * | 3/2021 | Liu | G06N 3/0464 |
| 2025/0046062 | A1 * | 2/2025 | Yamamoto | G06V 10/82 |

FOREIGN PATENT DOCUMENTS

| | | | | |
|---|---|---|---|---|
| JP | 2011-237911 | A | 11/2011 | |
| JP | 2014-071684 | A | 4/2014 | |
| JP | 2015179423 | A * | 10/2015 | G06V 40/167 |
| JP | 2021-190041 | A | 12/2021 | |

OTHER PUBLICATIONS

International Search Report for PCT Application No. PCT/JP2021/046251, mailed on Mar. 15, 2022.

* cited by examiner (a)

(b−1)

+ DIFFERENT PERSON LABEL 1

(b−2)

+ DIFFERENT PERSON LABEL 2

(b−3)

+ DIFFERENT PERSON LABEL 3

INFORMATION PROCESSING APPARATUS, INFORMATION PROCESSING METHOD, AND RECORDING MEDIUM

This application is a National Stage Entry of PCT/JP2021/046251 filed on Dec. 15, 2021, the contents of all of which are incorporated herein by reference, in their entirety.

TECHNICAL FIELD

This disclosure relates to technical fields of an information processing apparatus, an information processing method, and a recording medium.

BACKGROUND ART

Patent Literature 1 discloses a technique/technology in which when a plurality of similar face patterns are registered in a dictionary, the similar face patterns are classified as a similar group, and specified processing different from usual collation processing determines whether, the face patterns belonging to the similar group can be collated, thereby to maintain a certain collation performance and a security level, even when similar face patterns exist in a face collating dictionary. Furthermore, Patent Literature 2 discloses a technique/technology capable of performing stable identification, even when extremely alike persons such as twins are registered, by using, for comparison, not only similarity with the original dictionary but also similarity with the other dictionary, as an identification criterion, in personal identification based on the face image of a person to be identified. Furthermore, Patent Literature 3 discloses a technique/technology capable of authenticating a person at high accuracy even when persons with similar faces with one another are registered, by storing an associated relationship between registered face information of a registered person and a complementary person; collating input face information expressing the characteristics of the face included in a face region extracted from an input image, respectively with a plurality of pieces of registered face information on registered persons; identifying the registered person of the registered face information which is similar to the input face information among the plurality of registered persons as an authentication candidate person; and determining that the face photographed in the plurality of input images is the face of the registered person based on the candidate number of times that either the registered person or the associated complementary person is identified as the authentication candidate person in a plurality of input images photographed at different times.

CITATION LIST

Patent Literature

Patent Literature 1: JP2008-071366A
Patent Literature 2: JP2004-078686A
Patent Literature 3: JP2014-071684A

SUMMARY

Technical Problem

It is an example object of this disclosure to provide an information processing apparatus, an information processing method, and a recording medium that aim to improve the techniques/technologies disclosed in Citation List.

Solution to Problem

An information processing apparatus according to a first example aspect of this disclosure includes: an acquisition unit that acquires a determination target image capturing a plurality of faces; a determination unit that determines whether two faces of the plurality of faces captured in the determination target image, are similar to a predetermined extent or more; and a storage unit that stores two face images respectively including the two faces, in association with a different person label indicating that two people corresponding to the two face images are non-identical persons, in a case where the two faces are similar to a predetermined extent or more.

An information processing apparatus according to a second example aspect of this disclosure includes: an acquisition unit that acquires a dataset including a plurality of face images respectively capturing faces of a plurality of people whose face are similar to a predetermined extent or more, and label information about a correct answer class to which the plurality of people belong in common, from among a plurality of classes; an extraction unit that extracts respective feature quantities of the faces of the plurality of people, on the basis of the plurality of face images; a class identification unit that generates class identification information about an estimated class to which the plurality of people belong in common, from among the plurality of classes, on the basis of the feature quantities; and a learning unit that performs machine learning of setting operation characteristics of the extraction unit, on the basis of the label information and the class identification information.

An information processing method according to a first example aspect of this disclosure includes: acquiring a determination target image capturing a plurality of faces; determining whether two faces of the plurality of faces captured in the determination target image, are similar to a predetermined extent or more; and storing two face images respectively including the two faces, in association with a different person label indicating that two people corresponding to the two face images are non-identical persons, in a case where the two faces are similar to a predetermined extent or more.

An information processing method according to a second example aspect of this disclosure includes: acquiring a dataset including a plurality of face images respectively capturing faces of a plurality of people whose face are similar to a predetermined extent or more, and label information about a correct answer class to which the plurality of people belong in common, from among a plurality of classes; extracting respective feature quantities of the faces of the plurality of people, on the basis of the plurality of face images; generating class identification information about an estimated class to which the plurality of people belong in common, from among the plurality of classes, on the basis of the feature quantities; and performing machine learning of setting operation characteristics of the extracting, on the basis of the label information and the class identification information.

A recording medium according to a first example aspect of this disclosure is a recording medium on which a computer program that allows a computer to execute an information processing method is recorded, the information processing method including: acquiring a determination target image capturing a plurality of faces; determining whether two faces of the plurality of faces captured in the determination target image, are similar to a predetermined extent or more; and storing two face images respectively including the two faces, in association with a different person label indicating that two people corresponding to the two face images are non-identical persons, in a case where the two faces are similar to a predetermined extent or more.

A recording medium according to a second example aspect of this disclosure is a recording medium on which a computer program that allows a computer to execute an information processing method is recorded, the information processing method including: acquiring a dataset including a plurality of face images respectively capturing faces of a plurality of people whose face are similar to a predetermined extent or more, and label information about a correct answer class to which the plurality of people belong in common, from among a plurality of classes; extracting respective feature quantities of the faces of the plurality of people, on the basis of the plurality of face images; generating class identification information about an estimated class to which the plurality of people belong in common, from among the plurality of classes, on the basis of the feature quantities; and performing machine learning of setting operation characteristics of the extracting, on the basis of the label information and the class identification information.

DESCRIPTION OF EXAMPLE EMBODIMENTS

Hereinafter, an information processing apparatus, an information processing method, and a recording medium according to example embodiments will be described with reference to the drawings.

1: First Example Embodiment

First, an information processing apparatus, an information processing method, and a recording medium according to a first example embodiment will be described. The following describes the information processing apparatus, the information processing method, and the recording medium according to the first example embodiment, by using an information processing apparatus 1 to which the information processing apparatus, the information processing method, and the recording medium according to the first example embodiment are applied.

[1-1: Configuration of Information Processing Apparatus 1]

Figure 1:
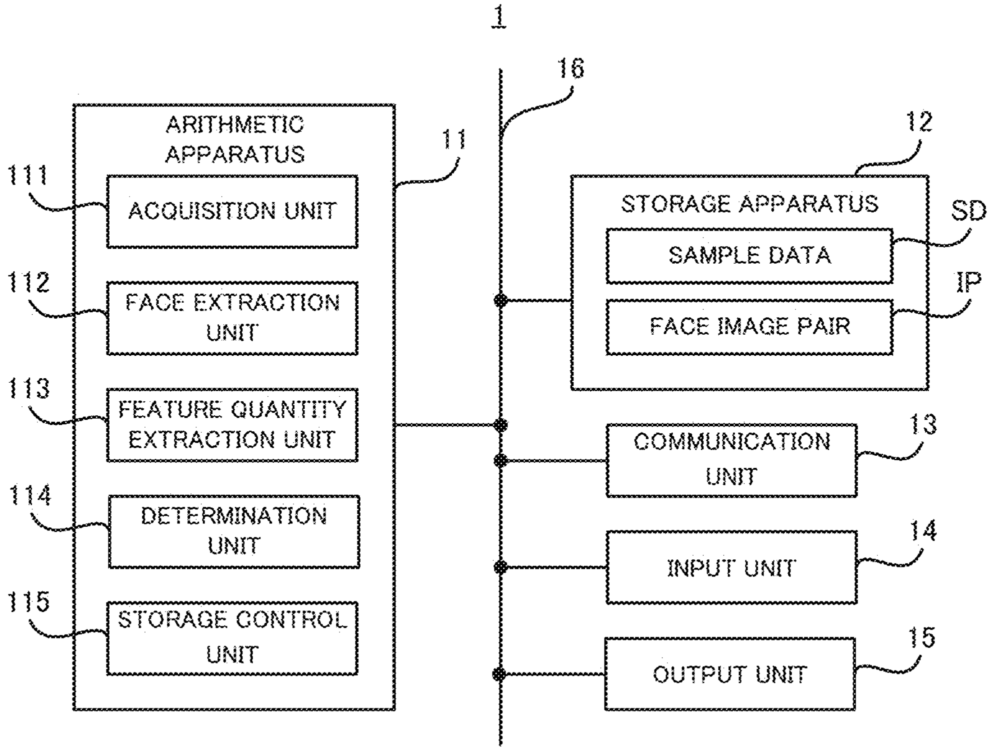
FIG. 1 is a block diagram illustrating a configuration of an information processing apparatus in a first example embodiment.

First, a configuration of the information processing apparatus 1 in the first example embodiment will be described with reference to FIG. 1. FIG. 1 is a block diagram illustrating the configuration of the information processing apparatus 1 in the first example embodiment.

As illustrated in FIG. 1, the information processing apparatus 1 includes an arithmetic apparatus 11 and a storage apparatus 12. Furthermore, the information processing apparatus 1 may include a communication apparatus 13, an input apparatus 14, and an output apparatus 15. The information processing apparatus 1, however, may not include at least one of the communication apparatus 13, the input apparatus 14, and the output apparatus 15. The arithmetic apparatus 11, the storage apparatus 12, the communication apparatus 13, the input apparatus 14, and the output apparatus 15 may be connected through a data bus 16.

The arithmetic apparatus 11 includes at least one of a CPU (Central Processing Unit), a GPU (Graphics Processing Unit), and a FPGA (Field Programmable Gate Array), for example. The arithmetic apparatus 11 reads a computer program. For example, the arithmetic apparatus 11 may read a computer program stored in the storage apparatus 12. For example, the arithmetic apparatus 11 may read a computer program stored by a computer-readable and non-transitory recording medium, by using a not-illustrated recording medium reading apparatus provided in the information processing apparatus 1 (e.g., the input apparatus 14 described later). The arithmetic apparatus 11 may acquire (i.e., download or read) a computer program f from a not-illustrated apparatus disposed outside the information processing apparatus 1 through the communication apparatus 13 (or another communication apparatus). The arithmetic apparatus 11 executes the read computer program. Consequently, a logical functional block for performing an operation to be performed by the information processing apparatus 1 is realized or implemented in the arithmetic apparatus 11. That is, the arithmetic apparatus 11 is allowed to function as a controller for realizing or implementing the logical functional block for performing an operation (in other words, processing) to be performed by the information processing apparatus 1.

FIG. 1 illustrates an example of the logical functional block realized or implemented in the arithmetic apparatus 11 to perform an information processing operation. As illustrated in FIG. 1, an acquisition unit 111 that is a specific example of the "acquisition unit", a face extraction unit 112, a feature quantity extraction unit 113, a determination unit 114 that is a specific example of the "determination unit", and a storage control unit 115 that is a specific example of the "storage unit" are realized or implemented in the arithmetic apparatus 11. At least one of the face extraction unit 112 and the feature quantity extraction unit 113 may not be realized or implemented in the arithmetic apparatus 11.

Details of operation of each of the acquisition unit 111, the face extraction unit 112, the feature quantity extraction unit 113, and the determination unit 114 will be described later with reference to FIG. 2 and FIG. 3. The arithmetic apparatus 11, however, may not include the face extraction unit 112.

The storage apparatus 12 is configured to store desired data. For example, the storage apparatus 12 may temporarily store a computer program to be executed by the arithmetic apparatus 11. The storage apparatus 12 may temporarily store data that are temporarily used by the arithmetic apparatus 11 when the arithmetic apparatus 11 executes the computer program. The storage apparatus 12 may store data that are stored by the information processing apparatus 1 for a long time. The storage apparatus 12 may include a at least one of a RAM (Random Access Memory), a ROM (Read Only Memory), a hard disk apparatus, a magneto-optical disk apparatus, a SSD (Solid State Drive), and a disk array apparatus. That is, the storage apparatus 12 may include a non-transitory recording medium.

The storage apparatus 12 may store sample data SD to be used by the information processing apparatus 1 for the information processing operation. The storage apparatus 12, however, may not store the sample data SD. In a case where the storage apparatus 12 does not store the sample data SD, the sample data SD may be acquired from an apparatus external to the information processing apparatus 1 by using the communication apparatus 13, or the input apparatus 14 may receive an input of the sample data SD from an outside of the information processing apparatus 1.

The storage apparatus 12 may also store a face image pair IP generated by the information processing operation of the information processing apparatus 1.

Here, the information processing apparatus 1 in the first example embodiment may use an image capturing a face, as the sample data SD. The information processing apparatus 1 may generate a dataset used for machine learning of a face recognition engine, by using the sample data SD. Since the dataset used for machine learning preferably includes a large amount of data, such as, for example, 10000 pieces or more, it is preferable that a large amount of sample data SD are collected.

The communication apparatus 13 is configured to communicate with an apparatus external to the information processing apparatus 1 through a not-illustrated communication network.

The input apparatus 14 is an apparatus that receives an input of information to the information processing apparatus 1 from the outside the information processing apparatus 1. For example, the inputting apparatus 14 may include an operating apparatus (e.g., at least one of a keyboard, a mouse, and a touch panel) that is operable by an operator of the information processing apparatus 1. For example, the input apparatus 14 may include a reading apparatus that is configured to read information recorded as data on a recording medium that is externally attachable to the information processing apparatus 1.

The output apparatus 15 is an apparatus that outputs information to the outside of the information processing apparatus 1. For example, the output apparatus 15 may output information as an image. That is, the output apparatus 15 may include a display apparatus (a so-called display) that is configured to display an image indicating the information that is desirably outputted. For example, the output apparatus 15 may output information as audio/sound. That is, the output apparatus 15 may include an audio apparatus (a so-called speaker) that is configured to output audio/sound. For example, the output apparatus 15 may output information onto a paper surface. That is, the output apparatus 15 may include a print apparatus (a so-called printer) that is configured to print desired information on the paper surface.

[1-2: Information Processing Operation Performed by Information Processing Apparatus 1]

Next, an information processing operation performed by the information processing apparatus 1 in the first example embodiment will be described with reference to FIG. 2 and FIG. 3. The information processing operation performed by the information processing apparatus 1 in the first example embodiment may be an annotation operation of labeling a face image. More specifically, the information processing operation performed by the information processing apparatus 1 in the first example embodiment may be an annotation operation of associating two face images respectively including two faces that are similar to a predetermined extent or more, with a different person label indicating that two people corresponding to the two face images are non-identical persons. The two face images respectively including the two faces that are similar to a predetermined extent or more, may include a first face image including a first face and a second face image including a second face.

[1-3: Overview of Annotation Operation]

First, with reference to FIG. 2, an outline of the annotation operation in the first example embodiment will be described. FIG. 2 is a diagram illustrating the outline of the annotation operation in the first example embodiment. As illustrated in FIG. 2(*a*), in a case where a plurality of people (three people of a person A, a person B, and a person C in FIG. 2(*a*)) are captured in a single image, the plurality of people can be considered to be non-identical persons. For example, in a case where the three people of the person A, the person B, and the person C are very similar, three similar faces are arranged, but each of the three faces can be determined to be the face a non-identical person.

Therefore, in the first example embodiment, in a case where a single image captures a plurality of faces of people, even when the faces are similar, the information processing apparatus 1 determines that each person is a non-identical person. Then, the information processing apparatus 1 adds the "different person label" indicating a non-identical person having the similar face, to each person. For example, it is hard to distinguish between similar faces, such as those of twins. This is also hard even in a machine such as neural network, and it is required to build a machine that is capable of distinguishing between faces that are very similar. The annotation operation in the first example embodiment makes it possible to generate learning data that may be used for machine learning of distinction of the faces that are very similar.

Figure 2:
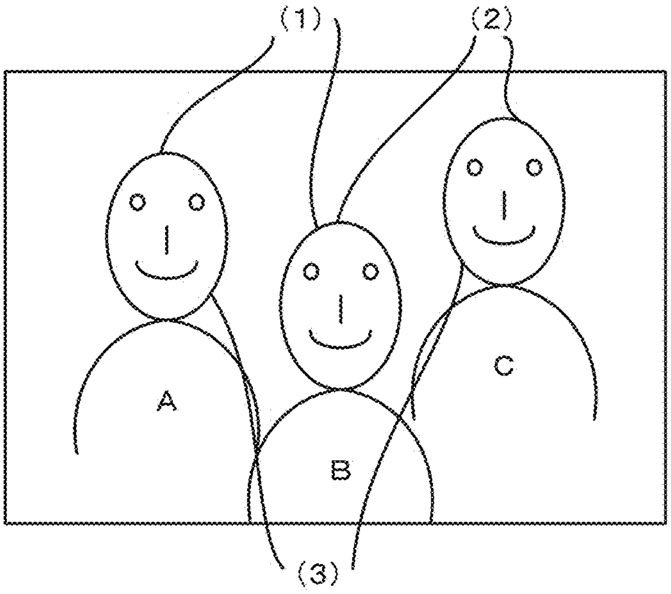
FIG. 2 is a schematic diagram illustrating an annotation operation in the first example embodiment.
Figure 2:
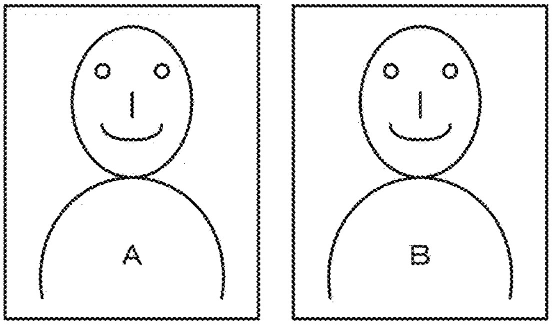
Figure 2:
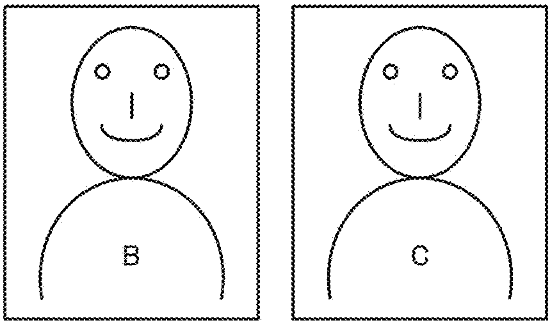
Figure 2:
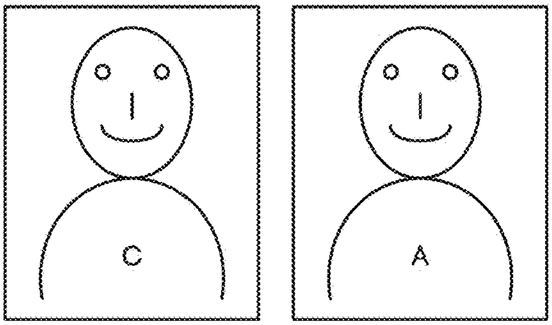

A case where the three people of the person A, the person B, and the person C illustrated in FIG. 2(*a*) are, for example, triplets, and their faces are very similar, will be exemplified and described. In many cases, it is hard for those who are not so close to the person A, the person B, and the person C, to distinguish between the person A, the person B, and the person C. In order to generate the learning data that is useful for machine learning that allows accurate distinction of the faces, even when it is hard to distinguish between the faces as described above, the information processing apparatus 1 may generate a face image pair IP.

In the annotation operation in the first example embodiment, the information processing apparatus 1 may perform the processing on each pair of all the people captured in the image. As illustrated in FIG. 2(*a*), in a case where three people are captured, the information processing apparatus 1 may perform three types of processing; processing on a pair of the person A and the person B illustrated in FIG. 2(*b*-1), processing on a pair of the person B and the person C illustrated in FIG. 2(*b*-2), and processing on a pair of the person C and the person A illustrated in FIG. 2(*b*-3).

Then, in the processing illustrated in FIG. 2(*b*-1), the information processing apparatus 1 adds a "different person label 1" indicating that the person A and the person B are non-identical persons, to each of an image of the person A and an image of the person B. Furthermore, in the processing illustrated in FIG. 2(*b*-2), the information processing apparatus 1 adds a "different person label 2" indicating that the person B and the person C are non-identical persons, to each of the image of the person B and an image of the person C.

Furthermore, in the processing illustrated in FIG. 2(*b*-3), the information processing apparatus 1 adds a "different person label 3" indicating that the person B and the person C are non-identical persons, to each of the image of the person C and the image of the person A.

Figure 3:
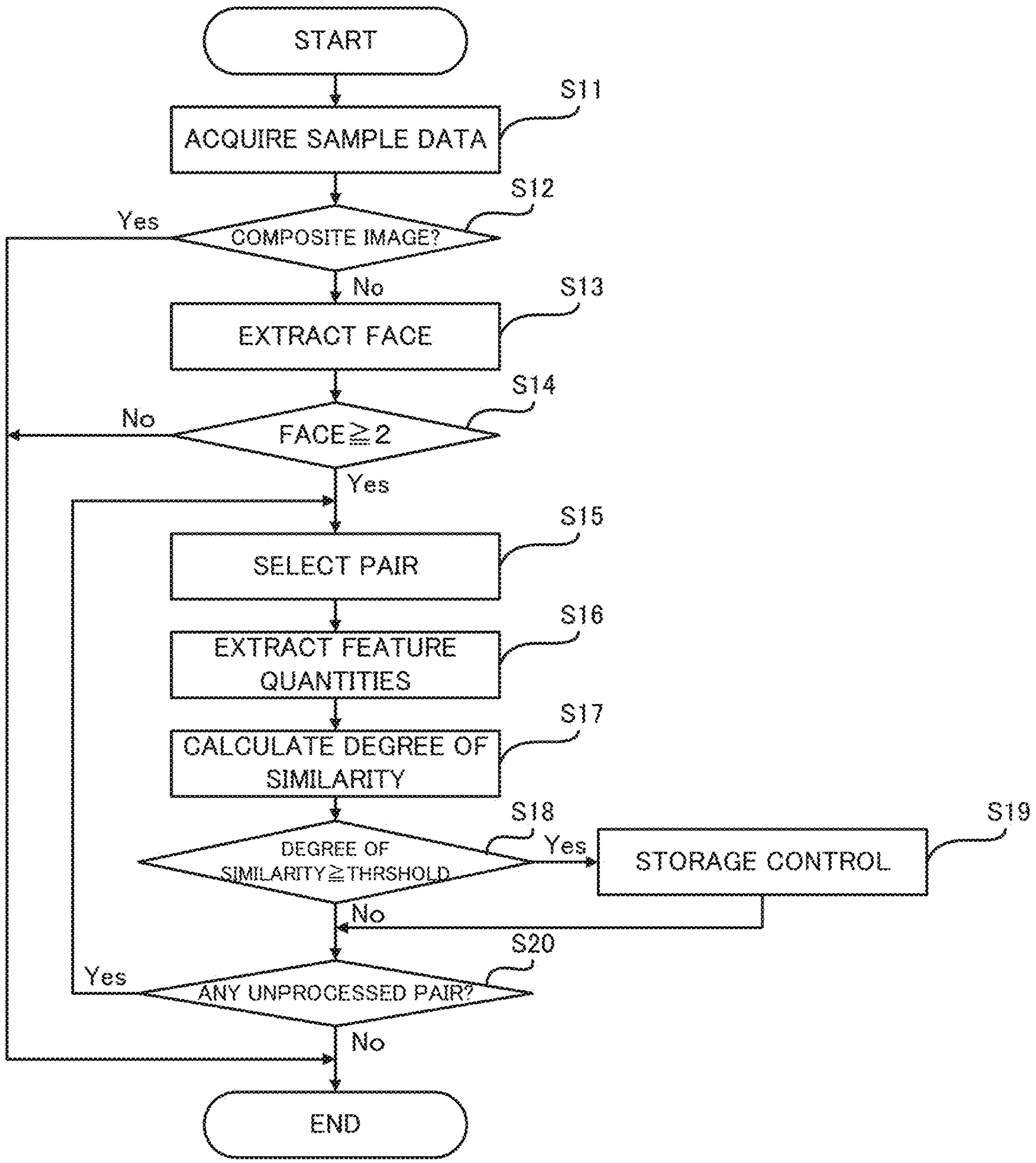
FIG. 3 is a flowchart illustrating a flow of an annotation operation performed by the information processing apparatus in the first example embodiment.

With reference to FIG. 3, a flow of the annotation operation performed by the information processing apparatus 1 in the first example embodiment will be described. FIG. 3 is a flowchart illustrating the flow of the annotation operation performed by the information processing apparatus 1 in the first example embodiment.

As illustrated in FIG. 3, the acquisition unit 111 acquires one piece of sample data SD as a determination target image (step S11).

The acquisition unit 111 determines whether or not the sample data SD is a composite image obtained by synthesizing a plurality of images (step S12).

When the sample data SD are not a composite image obtained by synthesizing a plurality of images (the step S12: No), the face extraction unit 112 extracts a face area from the sample data SD (step S13). The face extraction unit 112 determines whether or not two or more faces are captured in the sample data SD (step S14). The face extraction unit 112 may determine whether there are two or more face areas extracted in the step S13.

When two or more faces are captured in the sample data SD (the step S14: Yes), the face extraction unit 112 selects a pair of two faces from the two or more faces (step S15).

The feature quantity extraction unit 113 extracts respective feature quantities of the faces included in the selected pair (step S16).

The determination unit 114 calculates a degree of similarity between the feature quantities of the faces included in the selected pair (step S17). The determination unit 114 determines whether the two faces included in the selected pair are similar to a predetermined extent or more, on the basis of the calculated degree of similarity (step S18). The determination unit 114 may calculate, for example, a cosine similarity as the degree of similarity. In this case, the determination unit 114 may determine that the two faces are similar to a predetermined extent or more, when degree of the similarity is greater than or equal to a predetermined threshold.

When the two faces included in the selected pair are similar to a predetermined extent or more (the step S18: Yes), the storage control unit 115 stores, in the storage apparatus 12, two face images respectively including the two faces, in association with the different person label indicating that two people corresponding to the two face images are non-identical persons (step S19). The storage control unit 115 may store, in the storage apparatus 12, each of the first face image including the first face and the second face image including the second face, in association with the different person label.

In the example illustrated in FIG. 2, suppose that the three people of the person A, the person B, and the person C are similar to a predetermined extent or more. In this instance, (1) as for the pair of the person A and the person B, s illustrated in FIG. 2(*b*-1), the storage control unit 115 may store, in the storage apparatus 12, a face image pair IP0 with the different person label in which the image of the person A and the image of the person B (a face image pair 1) is associated with the "different person label 1" indicating non-identical persons. (2) As for the pair of the person B and the person C, as illustrated in FIG. 2(*b*-2), the storage control unit 115 may store, in the storage apparatus 12, a face image pair IP0 with the different person label in which the image of the person B and the image of the person C (a face image pair 2) is associated with the "different person label 2" indicating non-identical persons. (3) As for the pair of the person C and the person A, as illustrated in FIG. 2(*b*-3), the storage control unit 115 may store, in the storage apparatus 12, a face image pair IP0 with the different person label in which the image of the person C and the image of the person A (a face image pair 3) is associated with the "different person label 3" indicating non-identical persons.

When the two faces included in the selected pair are not similar to a predetermined extent or more (the step S18: No), the operation proceeds to a step S20. The face extraction unit 112 determines whether or not there is a pair that is still unselected as a pair of two faces. When there is still an unselected pair (the step S20: Yes), the operation proceeds to the step S15. When there is no unselected pair (the step S20: No), the operation for the one piece of sample data SD is ended.

When the sample data SD are the composite image obtained by synthesizing a plurality of images (the step S12: Yes), the operation for the one piece of sample data SD is ended.

The arithmetic apparatus 11 performs the step S15 to the step S19 on one piece of sample data SD. The arithmetic apparatus 11 may perform the step S11 to the step S19 on each of a plurality of pieces of sample data SD.

[1-4: Application Example of Face Image Pair IP Generated By Information Processing Apparatus 1]

The face image pair IP0 with the different person label generated by the information processing apparatus 1 in the first example embodiment may be used to build a feature quantity extraction model EM1. The feature quantity extraction model EM1 may be a model for identifying a face of a non-identical person as a face of a non-identical person, and for identifying a face of an identical person as a face of an identical person. In this case, a face image pair IP1 with a same person label in which two different images of an identical person (a face image pair) is associated with the same person label indicating an identical person, may be also prepared. Then, a face image pair IP including both the face image pair IP0 and the face image pair IP1, may be prepared, and the face image pair IP may be used as leaning data TD for building the feature quantity extraction model EM1.

Specifically, the feature quantity extraction model EM1 may be a model by which the face image pair associated with the different person label is determined to be the face images of non-identical persons and the face image pair associated with the same person label is determined to be the face images of an identical person. More specifically, when the face image pair IP is inputted, the feature quantity extraction model EM1 may extract the respective feature quantities using a network with a shared weight, and may determine whether the face image pair is the face images of non-identical persons or the face images of an identical person, by using a distance or degree of similarity between the respective feature quantities. In this case, the feature quantity extraction model EM1 may learn to minimize the distance or to maximize the similarity when the face image pair IP1 is inputted, and may learn to maximize the distance or to minimize the degree of similarity when the face image pair IP0 is inputted. The feature quantity extraction model EM1 may be a model that compares the distance or degree of similarity between the pieces of sample data SD.

In the first example embodiment, the terms of "different person label/same person label" are used, but another term such as, for example, "negative example/positive example", "negative class/positive class", and "0/1", may be used to represent the same technical content.

[1-5: Technical Effect of Information Processing Apparatus 1]

The information processing apparatus 1 in the first example embodiment is configured to add the "different person label" indicating non-identical persons, to the face image pair including similar faces that are known to be the faces of non-identical persons. By generating such labeled data, it is possible to generate the learning data that are useful for machine learning of distinction of people whose faces are very similar. It is then possible to improve authentication accuracy for a face image that is hard to be authenticated, such as those of twins. Furthermore, the determination unit 114 determines that two faces are similar to a predetermined extent or more, when a matching score of the respective feature quantities of the two faces is greater than or equal to a predetermined value. Thus, the determination unit 114 is capable of determining that two faces that are so similar that are erroneously determined to be an identical person at the time of collation, are similar to a predetermined extent or more.

2: Second Example Embodiment

Next, an information processing apparatus, an information processing method, and a recording medium according to a second example embodiment will be described. The following describes the information processing apparatus, the information processing method, and the recording medium according to the second example embodiment, by using an information processing apparatus 2 to which the information processing apparatus, the information processing method, and the recording medium according to the second example embodiment are applied.

In many cases, it is hard to accurately grasp or understand, by human observation, who has which face, as for the faces of those who are similar to a predetermined extent or more, such as multiple fetuses like twins, triplets, or the like. Therefore, it is often hard to prepare learning data with an accurate correct answer label added, for the face images of a plurality of people whose faces are similar to a predetermined extent or more. In addition, even in face recognition by a machine such as a neural network, it is often hard to accurately identify who has which face, as for a plurality of people whose faces are similar to a predetermined extent or more. On the other hand, it is relatively easy to group a plurality of people whose faces are similar to a predetermined extent or more into a same group. In addition, it is relatively easy to identify the face images of people who belong to the same group, as belonging to the same group. Therefore, it is relatively easy to assign the same label to the face images of people who belong to the same group. That is, it is relatively easy to prepare the sample data SD in which the same label is assigned to the face images of people who belong to the same group.

Therefore, the information processing apparatus 2 in the second example embodiment prepares the sample data SD in which the same label is assigned to the face images of people who belong to the same group. By using the sample data SD, build a feature quantity extraction model EM2 that extracts feature quantities so as to accurately determine, from the face image, to which group the face image belongs.

In the first example embodiment, the "different person label" is added to the face image pair from which it is hard to accurately identify who has which face, but it is known as non-identical persons. In contrast, in the second example embodiment, a "twin ID label" is applied to the face images from which it is hard to accurately identify who has which face and it is not known whether the faces are those of an identical person or non-identical persons. Here, the "twin ID label" may be a name of a label that is assigned to the face image of a person who belongs to the group of a plurality of people whose faces are similar to a predetermined extent or more. In other words, the "twin ID label" may be a label that is shared by a plurality of people whose faces are similar to a predetermined extent or more. In the second example embodiment, information indicating not "someone (an individual)", but "someone who belongs to a group (not an individual)" may be utilized.

The information processing operation performed by the information processing apparatus 2 in the second example embodiment may be a learning operation for identifying the faces of a plurality of people whose faces are similar to a predetermined extent or more, such as multiple fetuses, as belonging to the same class. More specifically, the information processing operation performed by the information processing apparatus 2 in the second example embodiment may be a learning operation of setting characteristics of an extraction operation of extracting the feature quantities of the faces such that the faces of a plurality of people whose faces are similar to a predetermined extent or more, such as multiple fetuses, belong to a same class. Furthermore, the information processing apparatus 2 in the second example embodiment may build the feature quantity extraction model EM2 for performing the face recognition of a plurality of non-identical persons whose faces are hard to be distinguished by others, such as those of multiple fetuses like twins.

[2-1: Configuration of Information Processing Apparatus 2]

Figure 4:
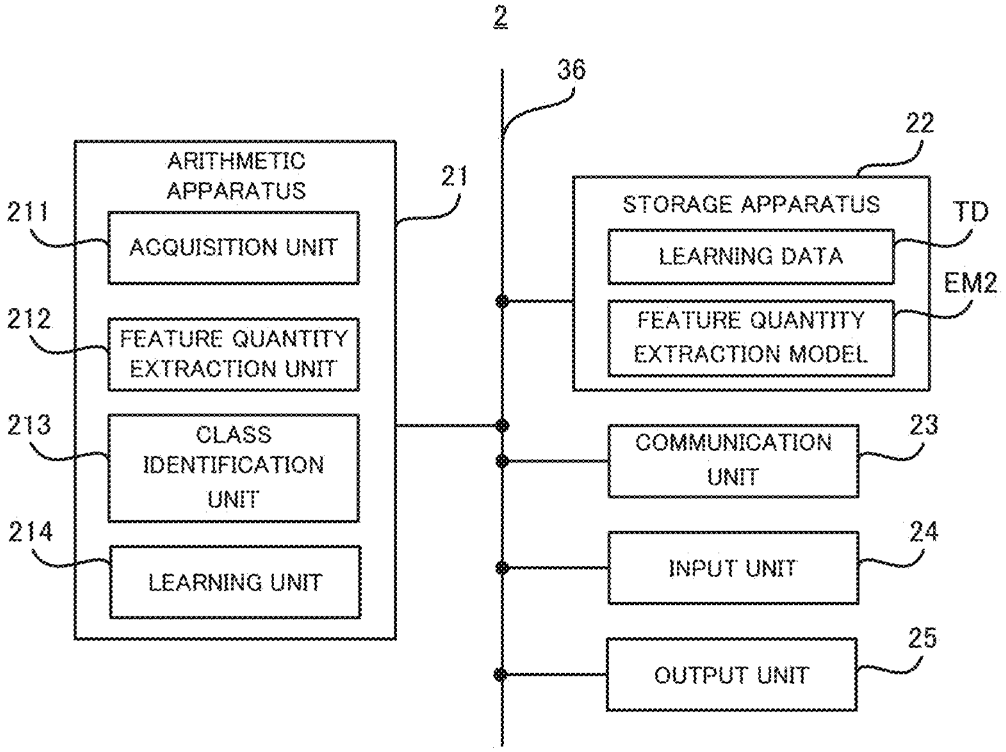
FIG. 4 is a block diagram illustrating a configuration of an information processing apparatus in a second example embodiment.

With reference to FIG. 4, a configuration of the information processing apparatus 2 in the second example embodiment will be described. FIG. 4 is a block diagram illustrating the configuration of the information processing apparatus 2 in the second example embodiment.

As illustrated in FIG. 4, the information processing apparatus 2 includes an arithmetic apparatus 21 and a storage apparatus 22. Furthermore, the information processing apparatus 2 may include a communication apparatus 23, an input apparatus 24, and an output apparatus 25. The information processing apparatus 2, however, may not include at least one of the communication apparatus 23, the input apparatus 24, and the output apparatus 25. The arithmetic apparatus 21, the storage apparatus 22, the communication apparatus 23, the input apparatus 24, and the output apparatus 25 may be connected through a data bus 26.

In the same manner that the arithmetic apparatus 11 is allowed to function as a controller for realizing or implementing the logical functional block for performing an operation to be performed by the information processing apparatus 1, the arithmetic apparatus 21 is allowed to function as a controller for realizing or implementing a logical functional block for performing an operation to be performed by the information processing apparatus 2.

FIG. 4 illustrates an example of the logical functional block realized or implemented in the arithmetic apparatus 21 to perform an information processing operation. As illustrated in FIG. 4, an acquisition unit 211 that is a specific example of the "acquiring unit", a feature quantity extraction unit 212 that is a specific example of the "extraction unit", a class identification unit 213 that is a specific example of the "class identification unit", and a learning unit 214 that is a specific example of the "learning unit" are realized or implemented in the arithmetic apparatus 21. Details of operation of each of the acquisition unit 211, the feature quantity extraction unit 212, the class identification unit 213, and the learning unit 214 will be described with reference to FIG. 5 to FIG. 7.

The storage apparatus 22 is configured to store desired data, as in the storage apparatus 12. The storage apparatus 22 may store learning data TD. The storage apparatus 22, however, may not store the learning data TD. In a case where the storage apparatus 22 does not store the learning data TD, the learning data TD may be acquired from an apparatus external to the information processing apparatus 2 by using the communication apparatus 23, or the input apparatus 24 may receive an input of the learning data TD from an outside of the information processing apparatus 2. Details of the learning data TD will be described with reference to FIG. 5.

Next, the information processing operation performed by the information processing apparatus 2 in the second example embodiment will be described with reference to FIG. 5 to FIG. 7.

[2-2: Concept of Twin ID Class that is Processing Target of Information Processing Apparatus 2]

First, a concept of a twin ID class that is a processing target of the information processing apparatus 2 in the second example embodiment will be described.

In the second example embodiment, the face images of a plurality of non-identical persons whose faces are similar to a predetermined extent or more, which are hard to be distinguished by others, are grouped into the same twin ID class. The learning data TD used in the second example embodiment include data in which the same "twin ID label" is attached to the face images belonging to the same twin ID class. The face images included in the same twin ID class may be face images of sisters and brothers, such as twins, triples, and quadruples, or may be face images of others/strangers who are very similar. The number of people whose face images are included in the same twin ID may be known.

Figure 5:
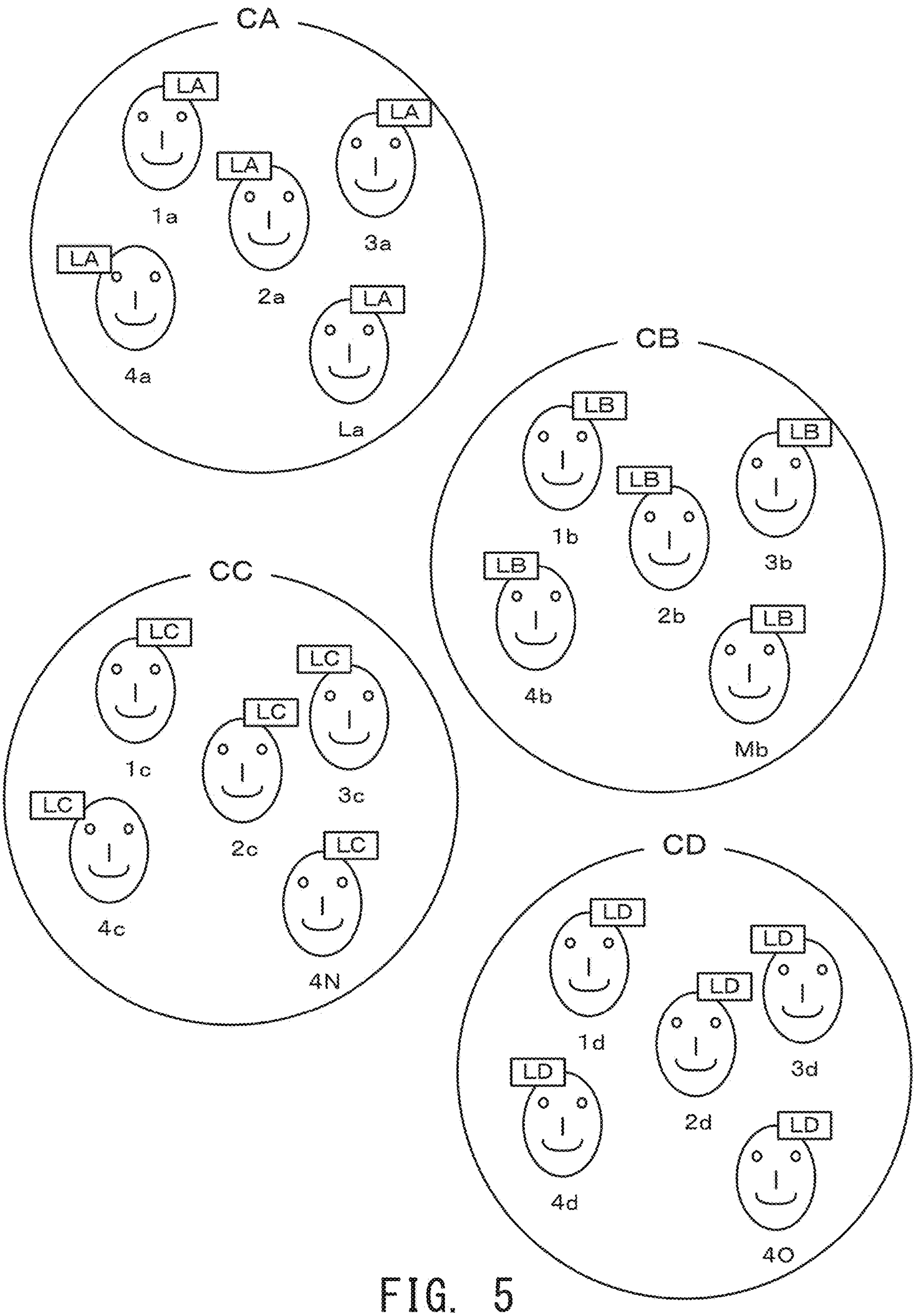
FIG. 5 is a conceptual diagram illustrating learning data used in the second example embodiment.

FIG. 5 is a conceptual diagram illustrating the learning data TD used in the second example embodiment. In the example illustrated in FIG. 5, the learning data TD include pieces of data belonging to four types of twin ID classes: a twin ID class CA, a twin ID class CB, a twin ID class CC, and a twin ID class CD. Each twin ID includes a plurality of face images of people. In the example illustrated in FIG. 5, the twin ID class CA includes L face images 1*a*, 2*a*, 3*a*, 4*a*, . . . , and La, and each of the face images included in the twin ID class CA is labeled with "LA" as the "twin ID label". Furthermore, added is information indicating that the number of peoples whose faces are captured in the face images belonging to the twin ID class CA is KA, such as two people, for example. In addition, it is unclear which of KA people corresponds to which of the L face images. The Twin ID class CB includes M face images 1*b*, 2*b*, 3*b*, 4*b*, . . . , and Mb, and each of the face images included in the twin ID class CB is labeled with "LB" as the "twin ID label." Furthermore, added is information indicating that the number of peoples whose faces are captured in the face images belonging to the twin ID class CB is KB, such as three people, for example. In addition, it is unclear which of KB people corresponds to which of the M face images. The twin ID class CC includes N face images 1*c*, 2*c*, 3*c*, 4*c*, . . . , and Nc, and each of the face images included in the twin ID class CC is labeled with "LC" as the "twin ID label." Furthermore, added is information indicating that the number of peoples whose faces are captured in the face images belonging to the twin ID class CC is KC, such as two people, for example. In addition, it is unclear which of KC people corresponds to which of the N face images. The twin ID class CD includes O face images of 1*d*, 2*d*, 3*d*, 4*d*, . . . , and Od, and each of the face images included in the twin ID class CD is labeled with "LD" as the "twin ID label." Furthermore, added is information indicating that the number of peoples whose faces are captured in the face images belonging to the twin ID class CD is KD, such as four people, for example. In addition, it is unclear which of KD people corresponds to which of the O face images.

[2-3: Outline of Information Processing Operations Performed by Information Processing Apparatus 2]

The information processing apparatus 2 in the second example embodiment performs machine learning of setting operation characteristics of the extraction operation of extracting the feature quantities of the faces, on the basis of acquired label information and generated class identification information. The label information is information about a correct answer class to which a plurality of people whose faces are similar to a predetermined extent or more, belong in common, from among a plurality of classes. The label information may indicate the correct answer class by using a correct answer value of the probability that the plurality of people belong in common to each of the plurality of classes. In addition, the class identification information is information about an estimated class to which a plurality of people whose faces are similar to a predetermined extent or more, belong in common, from among the plurality of classes. The class identification information may indicate the estimated class by using the probability that the plurality of people belong in common to each of the plurality of classes. The feature quantity extraction model EM2 may extract common features of the faces of people who belong to the same class, and the information processing apparatus 2 may accurately identify that they belong to the same class.

[2-3-1: Introduction of Cross-Entropy Error]

The information processing apparatus 2 in the second example embodiment may build the feature quantity extraction model EM2, by performing machine learning on the basis of a cross-entropy error calculated based on the label information and the class identification information. The information processing apparatus 2 in the second example embodiment may perform machine learning, on the basis of the cross-entropy error calculated by using a cross-entropy type loss function illustrated in the following [Equation 1], for example.

$$\frac{e^{s\cos(\theta_{yi}+m)}}{e^{s\cos(\theta_{yi}+m)}+\sum_j e^{s\cos(\theta_j)}} \quad \text{[Equation 1]}$$

The function illustrated in the [Equation 1] is a loss function based on the label information and the class identification information. yi indicates the correct answer class, and in the case illustrated in FIG. 5, it corresponds to the twin ID labeling (any of LA, LB, LC, and LD). exp(scos($\theta_{i,\ yi}$+m)) is a function related to the correct answer class, and $\Sigma_j$ exp(scos($\theta_{i,\ j}$)) is a function related to the plurality of classes other than the correct answer class. Furthermore, the cross-entropy type loss function illustrated in the [Equation 1], a margin m is added to the correct answer class, as compared with a general cross-entropy type loss function. That is, in the second example embodiment, in order to reduce dispersion in the class, it is possible to adopt the cross-entropy type loss function illustrated in the [Equation 1] that adds the margin m to the correct answer class. The feature quantity extraction model EM2 built by performing machine learning, is capable of extracting the feature quantities such that the feature quantities of the face images belonging to the same twin ID class are close to each other.

The feature quantity extraction model EM2 may be a model that compares a distance or degree of similarity between the sample data SD and a center. The center may be a feature quantity representing a class.

[2-3-2-1: Introduction of Subcenter to Cross-Entropy Type Loss Function]

Meanwhile, as a measure to a noisy dataset, i.e., a dataset including the sample data that are hard to distinguish, there is a technique/method of defining a plurality of subclasses for each of the plurality of classes (e.g., SubcenterArcFace). That is, it is a technique/method of including a plurality of subcenters (a plurality of center positions) in each of the plurality of classes. According to this technique/method, it is possible to extract the feature quantities of the sample data SD such that the feature quantities of the sample data SD are similar to any of the plurality of subcenters.

The face images belonging to the twin ID class, belongs to one class because it is hard to distinguish between them to see which of the face images shows whose face. In practice, however, since the face images belonging to the twin ID class, are the face images of any of a plurality of people, they can be considered, for a machine that identifies the class, as a noisy dataset, i.e., a dataset including the sample data that are hard to distinguish. Therefore, in the information processing apparatus 2 in the second example embodiment, each of the plurality of classes may include a plurality of subclasses.

Furthermore, in the second example embodiment, since the twin ID class includes the face images of a known number of people, it is expected that there are a same number of centers of a probability distribution, as the known number of people. Therefore, in the second example embodiment, the number of the plurality of subclasses included in each of the plurality of classes, may be the same as the number of the plurality of people who belong to the class. That is, there is no need to prepare many subcenters. Since it is possible to reduce the number of the subcenters, it is possible to reduce an amount of computation.

The feature quantity extraction model EM2 may be a model that compares a distance or degree of similarity between the sample data SD and the subcenters. The subcenter may be a feature quantity representing a subclass.

[2-3-2-2: Concept of Learning Process in Introduction of Subcenter]

Figure 6:
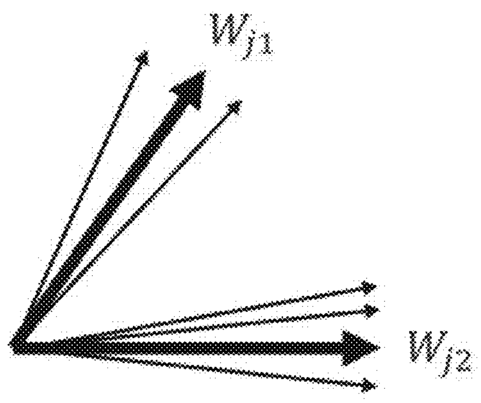
FIG. 6 is a conceptual diagram illustrating a loss function in the second example embodiment.

FIG. 6 is a conceptual diagram illustrating a learning process performed by the information processing apparatus 2 in the second example embodiment.

As described above, in the second example embodiment, there may be prepared the same number of subcenters as the number of people whose face images belong to a twin ID class j. Illustrated in FIG. 6 is a case where the number of people whose face images belong to the twin ID class j is two, and two subcenters $W_{j1}$ and $W_{j2}$ are prepared.

For example, in the case of learning of the feature quantity extraction model EM2 using a dataset illustrated in FIG. 5, KA subcenters corresponding to the twin ID class CA, KB subcenters corresponding to the twin ID class CB, KC subcenters corresponding to the twin ID class CC, and KD subcenters corresponding to the twin ID class CD may be prepared.

The information processing apparatus 2 in the second example embodiment may build the feature quantity extraction model EM2 such that each feature quantity is close to any of the subcenters. The face images belonging to the twin ID class, belongs to one class because it is hard to distinguish between them, but since they are actually one of the faces of two people, two subclasses may be prepared. In a case where a certain twin ID class includes each of the twins, the respective feature quantities are expected to be distributed in two distribution centers, because they are extracted from any of the faces of the two people. Therefore, when the two subcenters are prepared, it is possible to learn the extraction operation of extracting the feature quantities such that the feature quantity of the face of one person is close to one of the subcenters and the feature quantity of the face of the other person is close to the other subcenter.

In order to realize this, $\theta_{i,j}$ represented in the following [Equation 2] may be applied to $\theta_{i,j}$ in the [Equation 1].

$$\theta_{i,j} = \arccos\left(\max_k\left(W_{jk}^T x_i\right)\right),\quad k \in \{1, \ldots, K\} \qquad \text{[Equation 2]}$$

An inside of the parentheses in an arkcos function in the [Equation 2] indicates max processing of selecting any of the subcenters from among the plurality of subcenters prepared. That is, the learning unit 214 may adopt a subcenter $W_{jk}$ in which an inner product with the extracted feature quantity is the largest, from among a plurality of subcenter $W_{jk}$, thereby to calculate the cross-entropy error in the [Equation 2]. That is, the learning unit 214 may calculate the cross-entropy error in the [Equation 2], by adopting $W_{jk}$ in which cos $\theta_{i,j}$ is the largest, and $W_{jk}$ in which $\theta_{i,j}$ is the smallest. In addition, the feature quantity extraction model EM2 may assign a subclass of the subcenter selected by the max processing, to the class of the face image serving as an extraction target of extracting the feature quantity. That is, the feature quantity extraction model EM2 is also allowed to perform class assignment in the learning.

In other words, the class identification information may indicate the estimated class, by using the probability that each of the plurality of people belongs to any one of the plurality of subclasses included in one class, as the probability that the plurality of people belong in common to one of the plurality of classes. In addition, the class identification information may indicate the estimated class, by using the probability that each of the plurality of people belongs to any one subclass corresponding to a subclass feature quantity that is the most similar to the feature quantities extracted by the feature quantity extraction model EM2, from among the plurality of subclasses included in one class.

For example, in a case where twins belong to a certain twin ID class, two subcenters W1 and W2 may be prepared. Then, the machine learning may be performed such that the feature quantity extraction model EM2 extracts the feature quantity of the face image of one of the twins so as to be closer to the subcenter W1, and the feature quantity of the face image of the other twin so as to be closer to the subcenter W2. That is, in the second example embodiment, the plurality of subcenters are allowed to capture the respective features of the plurality of people belonging to the twin ID class.

The above describes an example in which the subcenter is selected by the max processing, but the subcenter may be selected by using another method such as an Attention mechanism.

[2-4: Learning Operation by Information Processing Apparatus 2]

Figure 7:
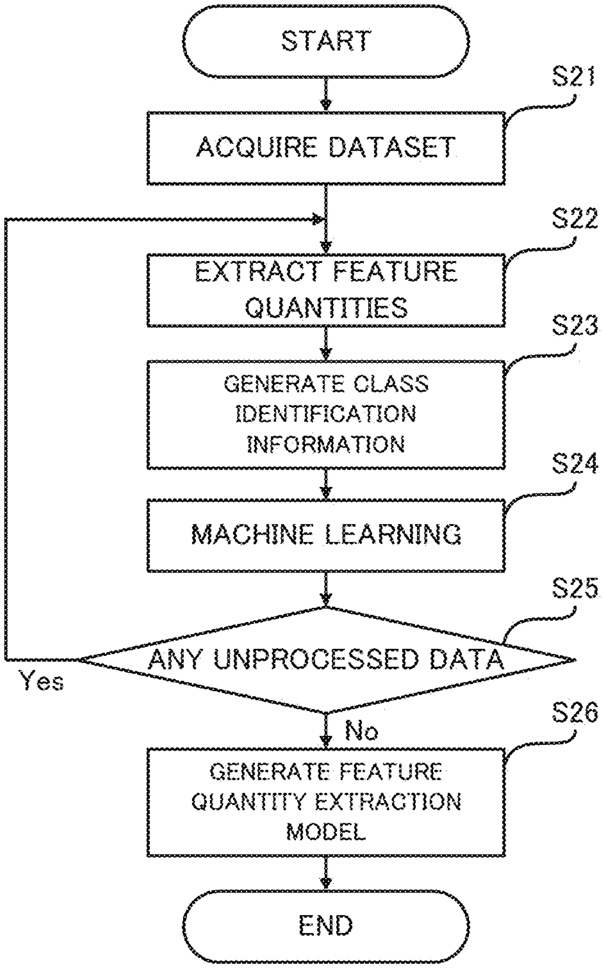
FIG. 7 is a flowchart illustrating a flow of a learning operation performed by the information processing apparatus in the second example embodiment.

FIG. 7 is a flowchart illustrating a flow of a learning operation performed by the information processing apparatus 2 in the second example embodiment.

As illustrated in FIG. 7, the acquisition unit 211 acquires a dataset including: a plurality of face images respectively capturing faces of a plurality of people whose face are similar to a predetermined extent or more; and the label information about the correct answer class to which the plurality of people belong in common, from among the plurality of classes (step S21). In the case illustrated in FIG. 5, the acquisition unit 211 may acquire: a dataset including the L face images 1*a*, 2*a*, 3*a*, 4*a*, . . . , and La and the label information "LA" about the correct answer class "CA"; a dataset including the M face images 1*b*, 2*b*, 3*b*, 4*b*, . . . , and Mb and the label information "LB" about the correct answer class "CB"; a dataset including the N face images 1*c*, 2*c*, 3*c*, 4*c*, . . . , and Nc and the label information "LC" about the correct answer class "CC"; and a dataset including the O face images 1*d*, 2*d*, 3*d*, 4*d*, . . . , and Od and the label information "LD" about the correct answer class "CD". The label information may indicate the correct answer class by using the correct answer value of the probability that the plurality of people belong in common to each of the plurality of classes.

The feature quantity extraction unit 212 extracts respective feature quantities of the faces of the plurality of people, on the basis of the plurality of face images (step S22). The feature quantity extraction unit 212 may extract the respective feature quantities of the faces of the plurality of people by using the feature quantity extraction model EM2.

The class identification unit 213 generates the class identification information about the estimated class to which the plurality of people belong in common, from among the plurality of classes, on the basis of the feature quantities (step S23). The class identification information may indicate the estimated class by using the probability that the plurality of people belong in common to each of the plurality of classes.

The learning unit 214 performs machine learning of setting the operation characteristics of the feature quantity extraction unit 212, on the basis of the label information and the class identification information (step S24). The learning unit 214 may perform machine learning on the basis of the cross-entropy error calculated based on the label information and the class identification information. The learning unit 214 may perform machine learning on the basis of the cross-entropy error calculated by using the cross-entropy type loss function using the label information and the class identification information.

The learning unit 214 causes the feature quantity extraction unit 212 to learn a method of extracting the feature quantities from the face images. Specifically, the learning unit 214 may cause the feature quantity extraction model EM2 used by the feature quantity extraction unit 212 to learn the method of extracting the feature quantities from the face images, thereby build the feature quantity extraction model EM2.

The learning unit 214 computes a gradient of a learning parameter included in the feature quantity extraction model EM2, on the basis of the cross-entropy error, and may update a value of the learning parameter included in the feature quantity extraction model EM2, by using the gradient of the learning parameter. The update of the learning parameter corresponds to the learning of the feature quantity extraction model EM2. For example, the learning unit 214 may optimize the value of the learning parameter so as to minimize the value of the cross-entropy error.

At least the operation of the step S24 may be performed for each batch size of the sample data SD. There is no particular limitation on a value of the batch size, and any value may be used.

The acquisition unit 211 determines whether or not there are any unprocessed learning data TD (step S25). When there are no unprocessed learning data TD (the step S25: No), the arithmetic apparatus 21 stores the feature quantity extraction model EM2 in the storage apparatus 22 (step S26). The operation proceeds to the step S22. When there are any unprocessed learning data TD (the step S25: Yes), the operation proceeds to the step S22.

The learning unit 214 may store the optimized feature quantity extraction model EM2 including the optimally updated learning parameter, in the storage apparatus 22.

Since the learning is advanced such that the feature quantity is similar to any of the subcenters, the extraction operation may be learned such that the feature quantity extracted from the face of one person is close to one subcenter, and the feature quantity extracted from the face of the other person is close to the other subcenter. In a case where two faces are respectively close to different subclasses, the two faces may be determined to be those of different people.

The face image pair IP generated in the first example embodiment may be used to learn the extracting operation such that the feature quantities extracted from the two faces are respectively close to different subclasses.

In the second example embodiment, each of pairs classified in the same twin ID class may be determined to be a pair of different persons or a pair of a same person, by using the feature quantity extraction model EM2 generated in the second example embodiment.

[2-5: Technical Effect of Information Processing Apparatus 2]

Since the feature quantity extraction model EM2 is configured to extract the feature quantities such that the feature quantities of the face images belonging to the same twin ID class are close to each other, it is possible to accurately identify the face images as belonging to the same twin ID class. Since the learning unit 214 performs machine learning on the basis of the cross-entropy error calculated based on the label information and the class identification information, the machine learning may be advanced such that the feature quantities extracted from the faces of a plurality of people whose faces are similar to a predetermined extent or more, are close to each other. In addition, there is no need to prepare many subcenters as long as the number of the subclasses is the same as the number of the plurality of people who belong to the class. Since it is possible to reduce the number of subcenters, it is possible to reduce the amount of computation. In addition, since the feature quantity extraction model EM2 is built such that each feature quantity is close to any of the subcenters, it is possible to identify which person the face image belongs to.

3: Supplementary Notes

With respect to the example embodiments described above, the following Supplementary Notes are further disclosed.

Supplementary Note 1

An information processing apparatus including:

an acquisition unit that acquires a determination target image capturing a plurality of faces;

a determination unit that determines whether two faces of the plurality of faces captured in the determination target image, are similar to a predetermined extent or more; and a storage unit that stores two face images respectively including the two faces, in association with a different person label indicating that two people corresponding to the two face images are non-identical persons, in a case where the two faces are similar to a predetermined extent or more.

Supplementary Note 2

The information processing apparatus according to Supplementary Note 1, wherein the determination unit determines that the two faces are similar to a predetermined extent or more in a case where a matching score between respective feature quantities of the two faces is greater than or equal to a predetermined value.

Supplementary Note 3

An information processing apparatus including:

an acquisition unit that acquires a dataset including a plurality of face images respectively capturing faces of a plurality of people whose face are similar to a predetermined extent or more, and label information about a correct answer class to which the plurality of people belong in common, from among a plurality of classes;

an extraction unit that extracts respective feature quantities of the faces of the plurality of people, on the basis of the plurality of face images;

a class identification unit that generates class identification information about an estimated class to which the plurality of people belong in common, from among the plurality of classes, on the basis of the feature quantities; and a learning unit that performs machine learning of setting operation characteristics of the extraction unit, on the basis of the label information and the class identification information.

Supplementary Note 4

The information processing apparatus according to Supplementary Note 3, wherein the label information indicates the correct answer class by using a correct answer value of a probability that the plurality of people belong in common to each of the plurality of classes, the class identification information indicates the estimated class by using the probability that the plurality of people belong in common to each of the plurality of classes, and the learning unit performs the machine learning on the basis of a cross-entropy error calculated based on the label information and the class identification information.

Supplementary Note 5

The information processing apparatus according to Supplementary Note 4, wherein each of the plurality of classes includes a plurality of subclasses, the class identification information indicates the estimated class, by using a probability that the plurality of people belong to any one of the plurality of subclasses included in one of the plurality of classes, as a probability that each of the plurality of people belongs in common to the one class, and a number of the plurality of subclasses included in each class is the same as a number of the plurality of people.

Supplementary Note 6

The information processing apparatus according to Supplementary Note 5, wherein the class identification information indicates the estimated class, by using a probability that each of the plurality of people belongs to any one subclass corresponding to a subclass feature quantity that is the most similar to the feature quantities extracted by the extraction unit, from among the plurality of subclasses included in the one class.

Supplementary Note 7

An information processing method including:

acquiring a determination target image capturing a plurality of faces;

determining whether two faces of the plurality of faces captured in the determination target image, are similar to a predetermined extent or more; and storing two face images respectively including the two faces, in association with a different person label indicating that two people corresponding to the two face images are non-identical persons, in a case where the two faces are similar to a predetermined extent or more.

Supplementary Note 8

An information processing method including:

acquiring a dataset including a plurality of face images respectively capturing faces of a plurality of people whose face are similar to a predetermined extent or more, and label information about a correct answer class to which the plurality of people belong in common, from among a plurality of classes;

extracting respective feature quantities of the faces of the plurality of people, on the basis of the plurality of face images;

generating class identification information about an estimated class to which the plurality of people belong in common, from among the plurality of classes, on the basis of the feature quantities; and performing machine learning of setting operation characteristics of the extracting, on the basis of the label information and the class identification information.

Supplementary Note 9

A recording medium on which a computer program that allows a computer to execute an information processing method is recorded, the information processing method including:

acquiring a determination target image capturing a plurality of faces;

determining whether two faces of the plurality of faces captured in the determination target image, are similar to a predetermined extent or more; and storing two face images respectively including the two faces, in association with a different person label indicating that two people corresponding to the two face images are non-identical persons, in a case where the two faces are similar to a predetermined extent or more.

Supplementary Note 10

A recording medium on which a computer program that allows a computer to execute an information processing method is recorded, the information processing method including:

acquiring a dataset including a plurality of face images respectively capturing faces of a plurality of people whose face are similar to a predetermined extent or more, and label information about a correct answer class to which the plurality of people belong in common, from among a plurality of classes;

extracting respective feature quantities of the faces of the plurality of people, on the basis of the plurality of face images;

generating class identification information about an estimated class to which the plurality of people belong in common, from among the plurality of classes, on the basis of the feature quantities; and performing machine learning of setting operation characteristics of the extracting, on the basis of the label information and the class identification information.

At least a part of the constituent components of each of the example embodiments described above can be combined with at least another part of the constituent components of each of the example embodiments described above, as appropriate. A part of the constituent components of each of the example embodiments described above may not be used. Furthermore, to the extent permitted by law, all the references (e.g., publications) cited in this disclosure are incorporated by reference as a part of the description of this disclosure.

This disclosure is not limited to the examples described above and is allowed to be changed, if desired, without departing from the essence or spirit of this disclosure which can be read from the claims and the entire identification. An information processing apparatus, an information processing method, and a recording medium with such changes are also intended to be within the technical scope of this disclosure.

DESCRIPTION OF REFERENCE CODES

1, 2 Information processing apparatus
11, 12 Arithmetic apparatus
12, 22 Storage apparatus
111, 211 Acquisition unit
112 Face extraction unit
113,212 Feature quantity extraction unit
114 Determination unit
115 Storage control unit
213 Class identification unit
214 Learning unit
IP Face image pair
SD Sample data
TD Learning data

What is claimed is:

1. An information processing apparatus comprising:

at least one memory that is configured to store instructions; and at least one processor that is configured to execute the instructions to:

acquire a determination target image capturing a plurality of faces;

determine whether two faces of the plurality of faces captured in the determination target image, are similar to a predetermined extent or more; and store two face images respectively including the two faces, in association with a different person label indicating that two people corresponding to the two face images are non-identical persons, in a case where the two faces are similar to a predetermined extent or more.

2. The information processing apparatus according to claim 1, wherein the at least one processor is configured to execute the instructions to determine that the two faces are similar to a predetermined extent or more in a case where a matching score between respective feature quantities of the two faces is greater than or equal to a predetermined value.

3. An information processing apparatus comprising:

at least one memory that is configured to store instructions; and at least one processor that is configured to execute the instructions to:

acquire a dataset including a plurality of face images respectively capturing faces of a plurality of people whose face are similar to a predetermined extent or more, and label information about a correct answer class to which the plurality of people belong in common, from among a plurality of classes;

extract respective feature quantities of the faces of the plurality of people, on the basis of the plurality of face images;

generate class identification information about an estimated class to which the plurality of people belong in common, from among the plurality of classes, on the basis of the feature quantities; and perform machine learning of setting operation characteristics of the extraction unit, on the basis of the label information and the class identification information.

4. The information processing apparatus according to claim 3, wherein the label information indicates the correct answer class by using a correct answer value of a probability that the plurality of people belong in common to each of the plurality of classes, the class identification information indicates the estimated class by using the probability that the plurality of people belong in common to each of the plurality of classes, and the at least one processor is configured to execute the instructions to perform the machine learning on the basis of a cross-entropy error calculated based on the label information and the class identification information.

5. The information processing apparatus according to claim 4, wherein each of the plurality of classes includes a plurality of subclasses, the class identification information indicates the estimated class, by using a probability that the plurality of people belong to any one of the plurality of subclasses included in one of the plurality of classes, as a probability that each of the plurality of people belongs in common to the one class, and a number of the plurality of subclasses included in each class is the same as a number of the plurality of people.

6. The information processing apparatus according to claim 5, wherein the class identification information indicates the estimated class, by using a probability that each of the plurality of people belongs to any one subclass corresponding to a subclass feature quantity that is the most similar to the feature quantities extracted, from among the plurality of subclasses included in the one class.

7. An information processing method comprising:

acquiring a determination target image capturing a plurality of faces;

determining whether two faces of the plurality of faces captured in the determination target image, are similar to a predetermined extent or more; and storing two face images respectively including the two faces, in association with a different person label indicating that two people corresponding to the two face images are non-identical persons, in a case where the two faces are similar to a predetermined extent or more.

* * * * *